March 21, 1961 B. BARENYI 2,976,081
GUIDE ARRANGEMENT FOR SLIDING DOORS IN MOTOR VEHICLES
Filed Dec. 2, 1957 4 Sheets-Sheet 1
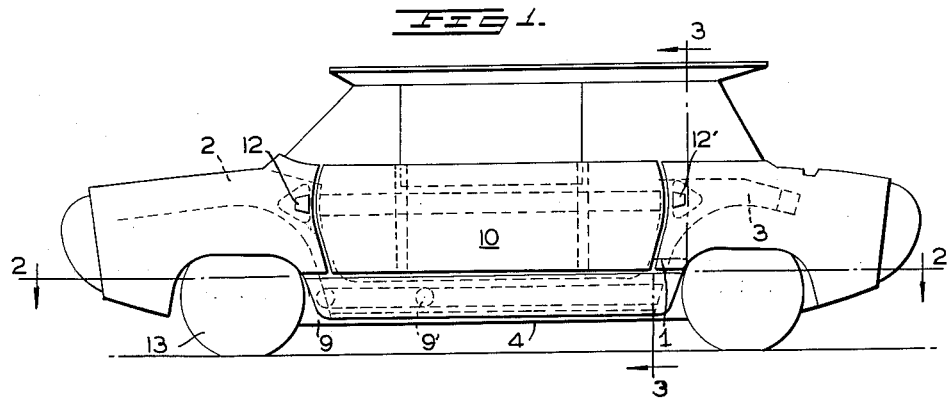
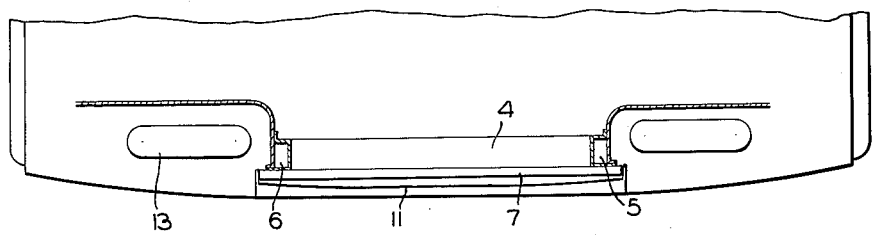
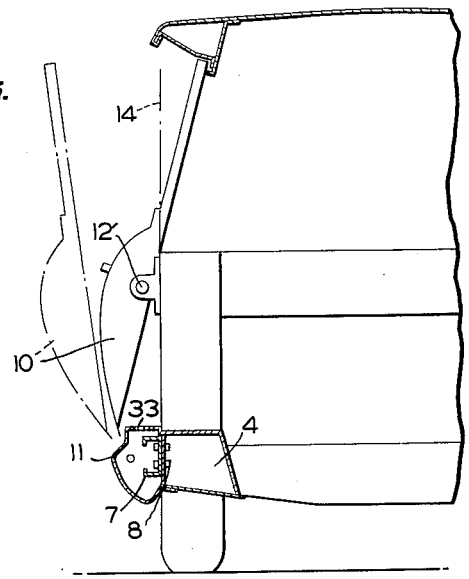
INVENTOR
B. BARENYI
BY *Dicke and Craig*
ATTORNEYS March 21, 1961 B. BARENYI 2,976,081
GUIDE ARRANGEMENT FOR SLIDING DOORS IN MOTOR VEHICLES
Filed Dec. 2, 1957 4 Sheets-Sheet 2
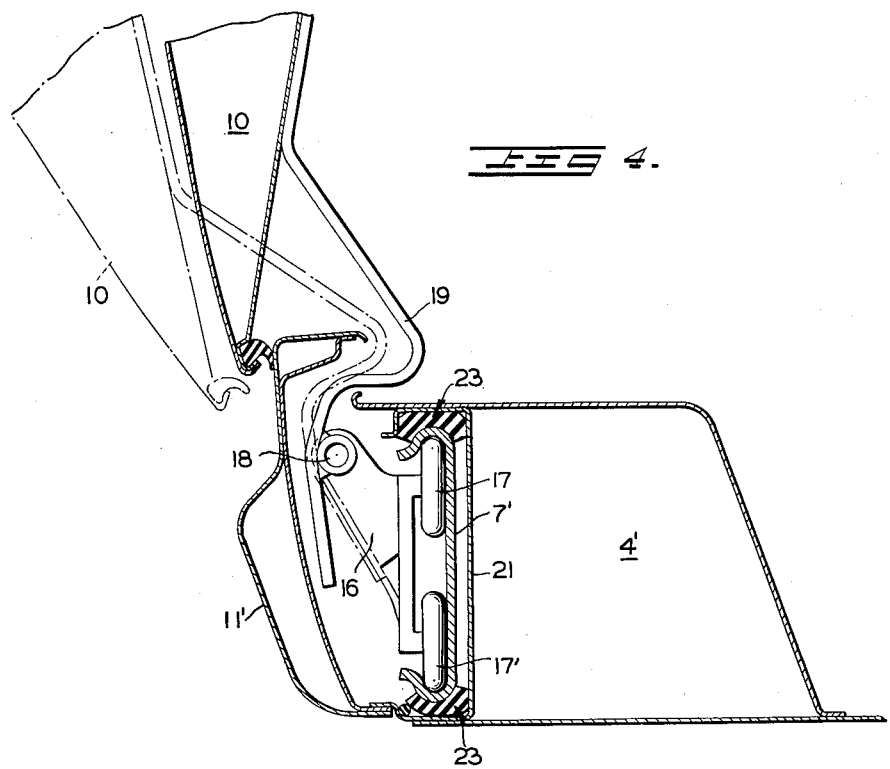
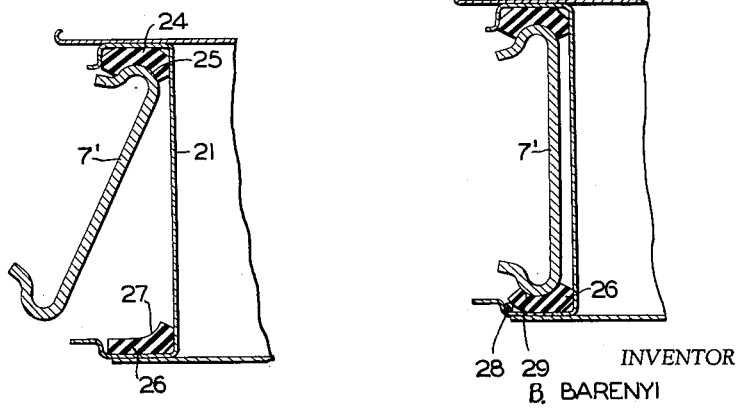
INVENTOR
B. BARENYI
BY Dicke and Billig
ATTORNEYS

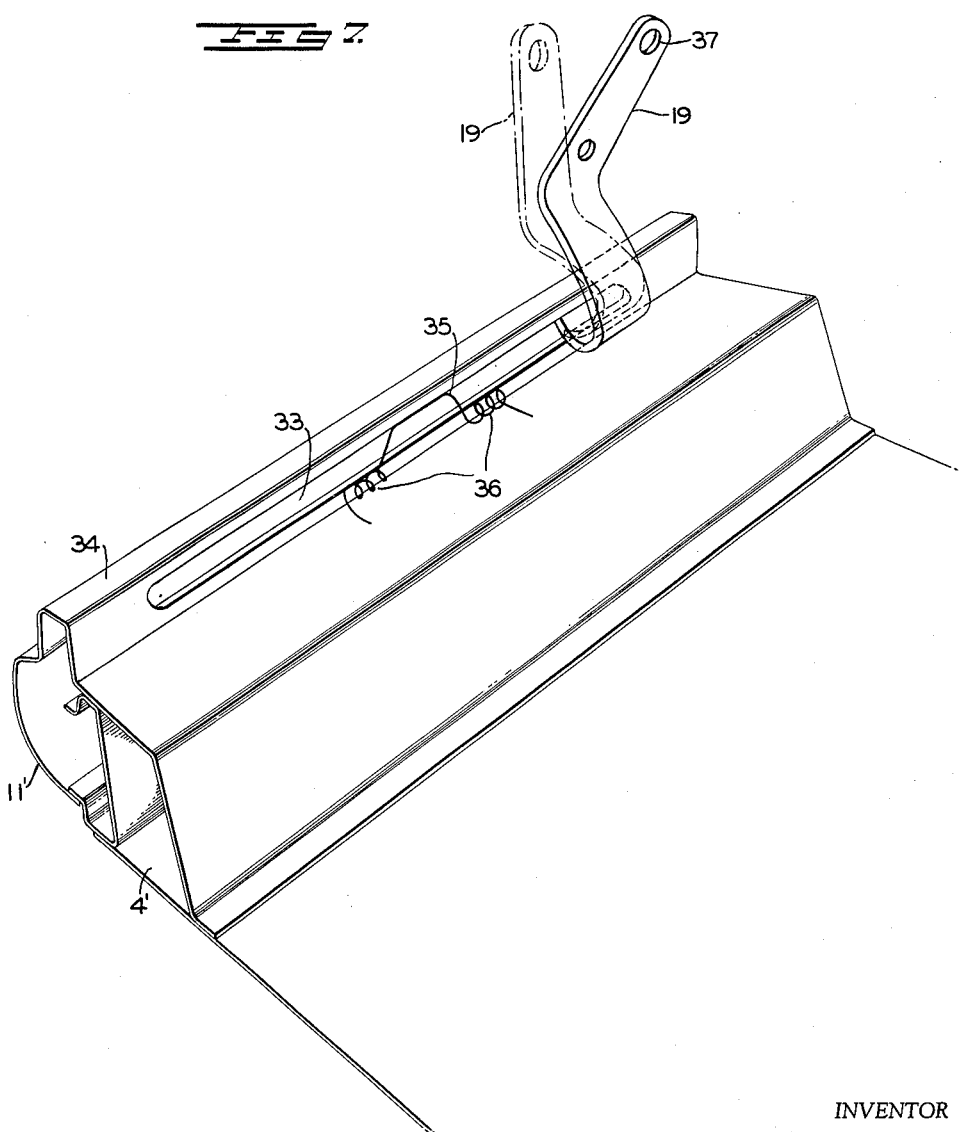

March 21, 1961  B. BARENYI  2,976,081
GUIDE ARRANGEMENT FOR SLIDING DOORS IN MOTOR VEHICLES
Filed Dec. 2, 1957  4 Sheets-Sheet 4
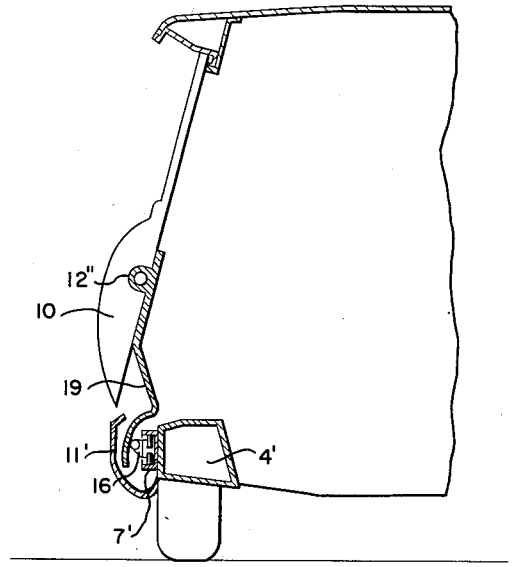
INVENTOR
B. BARENYI
BY Dicks and Craig
ATTORNEYS

United States Patent Office 2,976,081
Patented Mar. 21, 1961

2,976,081

GUIDE ARRANGEMENT FOR SLIDING DOORS IN MOTOR VEHICLES

Béla Barényi, Stuttgart-Vaihingen, Germany, assignor to Daimler-Benz Aktiengesellschaft, Stuttgart-Unterturkheim, Germany Filed Dec. 2, 1957, Ser. No. 700,062

Claims priority, application Germany Dec. 5, 1956

12 Claims. (Cl. 296—47)

The present invention relates to a guide arrangement for sliding members, rollers or groups of rollers of a motor vehicle sliding door guided within the lower region thereof. More particularly, the present invention relates to the particular construction of a guide arrangement for a sliding door of motor vehicles which is slidably guided in appropriate guide rails by means of suitable sliding members, rollers, or groups of rollers, and which may be opened by sliding movement or displacement in the longitudinal direction of the vehicle.

The present invention aims at such an arrangement and construction in which the guide rails necessary for the support and guidance of the sliding door are arranged advantageously in such a manner that the guide rails may be readily installed and mounted at the vehicle superstructure, such as the frame, and offer to the guide parts protection against adverse and harmful external influences, such as dirt or the like. Moreover, the guide system and arrangement for sliding doors in accordance with the present invention is so constructed as not to influence adversely or impair the external appearance of the motor vehicle as regards the connecting parts between the door and door guidance.

The present invention essentially consists in that the guide means are secured laterally at the main longitudinal bearer member of the vehicle frame, and more particularly in a detachable manner. The guide parts themselves are covered for purposes of protection against external influences and for assuring a closed surface of the vehicle body with a cover panel, shield or the like. Appropriately, the guide means for the door and the locking means for the door are disposed in a plane preferably extending vertically. In order to obtain as large as possible a space for the displacement of the door and therewith to obtain as large as possible an inlet opening into the vehicle, the guide means for the sliding parts which are constructed as rails as well as the cover means therefor may be constructed of greater length than the lateral longitudinal sills or threshold beams of the vehicle body or superstructure. Each cover is also provided with a slot through which extend the door support means constituting the connecting parts between the sliding members and the door itself and which may be arranged laterally either in the upper or lower part of the cover panel. The slot is further covered in the upward direction for protection against any penetrating rain water.

Accordingly, it is an object of the present invention to provide a guide arrangement for sliding doors of motor vehicles which is simple in construction, easy to manufacture, and which may be readily installed and mounted on the motor vehicle.

It is another object of the present invention to provide a guide arrangement for sliding doors of motor vehicles which protects the guide parts against dirt or moisture or other harmful external influences in order to assure a useful life for the parts which is as long as possible and an operation which is as free from trouble or repairs as possible.

Still another object of the present invention is to provide a guide system for sliding doors of motor vehicles which fulfills all the aforementioned objects without impairment to the outer appearance of the vehicle body.

A still further object of the present invention is the provision of an arrangement for guiding sliding doors in motor vehicles which provides a relatively large space for the displacement of the door to provide also as large as possible an inlet or ingress opening for the passengers.

A still further object of the present invention resides in the provision of such a guide system for sliding doors of motor vehicles as offers good protection against moisture, particularly against the penetration into the guide parts of any rain water.

A still further object of the present invention resides in the provision of a guide system for sliding doors of motor vehicles in which the sliding doors may be displaced over a relatively large portion of the entire vehicle length by increasing the length of the guide parts without impairing the relatively small turning radius of the wheels of the vehicle.

These and other objects, features and advantages of the present invention will become more obvious from the following description when taken in connection with the accompanying drawing which shows, for purposes of illustration only, several embodiments in accordance with the present invention, and wherein:

Figure 1 is a diagrammatic side view of a motor vehicle provided with a guide arrangement for sliding doors in accordance with the present invention;

Figure 2 is a horizontal cross-sectional diagrammatic view of the guide arrangement of Figure 1 taken along line 2—2 of Figure 1;

Figure 3 is a cross-sectional diagrammatic view, on an enlarged scale, of a motor vehicle taken along line 3—3 of Figure 1;

Figure 4 is a cross-sectional view through a guide system in accordance with the present invention in which the guide arrangement is shown on an enlarged scale;

Figures 5 and 6 show the manner of insertion and securing of the guide rail for use in the guide arrangement of Figure 4;

Figure 7 is a perspective view of a modified embodiment of a guide arrangement for sliding doors of motor vehicles illustrating the slot and cover means therefor as well as the door supports extending through the slot; and Figure 8 is a cross-sectional view similar to Figure 4 showing a sleeve for a locking mechanism attached to a support member of the guide system.

Referring now to the drawing, wherein like reference numerals are used throughout the various views to designate like parts, and more particularly to Figures 1, 2 and 3, reference numeral 1 designates the main longitudinal bearer member of the vehicle frame which is bent upwardly in the forward and rear end part thereof to form arm portions or extensions 2 and 3 disposed above the wheels of the vehicle. In the lower part thereof, the longitudinal bearer member 1 includes the main longitudinal sill or threshold beam 4. This main longitudinal threshold beam 4 is also clearly visible in Figures 2 and 3 whereas the upwardly extending frame parts 5 and 6, which are connected to the two ends of the main longitudinal threshold beam 4, are illustrated best in cross section in Figure 2. The frame, including the longitudinal bearer members thereof, may be of any suitable construction, for instance, as shown and disclosed in my copending applications, Serial No. 687,519, filed October 1, 1957, entitled "Motor Vehicle Frame Construction," and Serial No. 693,118, filed October 29, 1957, entitled "Frame Structure for Motor Vehicles."

As may be clearly seen from Figure 3, the U-shaped guide rail 7 is detachably secured to the main longitudinal threshold beam or bearer 4 by means of bolts 8 or the like which U-shaped rail 7 serves for guiding the sliding members, rollers or groups of rollers of the guide system.

The rollers 9 and 9', illustrated in Figure 1, are connected with the sliding door 10 by means of any appropriate supporting parts or connecting members, not illustrated in detail in this figure. The guide rail 7 is covered by means of a shield or cover means 11, for example, constituted by an appropriately shaped stamped panel which may be provided either laterally thereof, in the upper part thereof or in lower part thereof with a slot through which the support members constituting the connections between the rollers 9 and 9', on the one hand, and the door 10, on the other, may extend. The sliding door 10 is maintained in the closed or locked position thereof by means of two locking members 12 and 12' which are brought into the locking position thereof from about the center thereof toward the ends. The locking members 12 and 12' are appropriately constructed of conical shape and are also guided and secured at the vehicle superstructure in a conical recess provided with an adjacent cylindrical guidance, as more fully described, for instance, in my copending application, Serial No. 694,014, filed November 1, 1957, entitled "Sliding Door for Motor Vehicles."

As is particularly clearly visible from Figure 2, the guide rail 7 as well as the cover or shield 11 is constructed of greater length than the longitudinal threshold beam 4 at which it is detachably secured. This is made possible by the fact that both parts 7 and 11 are disposed further outwardly from the central longitutdinal plane of the vehicle than the longitudinal threshold beam 4 and, therefore, do not interfere with the rear edge of the front wheels 13 so as not to impair the ability of the vehicle to turn on a small radius, notwithstanding the fact that the parts 7 and 11 are of greater length than the threshold beam 4. Such a construction renders it possible to provide a longer guide arrangement for the sliding door which in turn offers the possibility of a relatively wide construction of the door and therewith the possibility of a larger sliding displacement which results in the provision of a larger ingress aperture into the vehicle for the passengers.

The guide rail 7 and the locking arrangements 12 and 12' are secured at the vehicle superstructure of the motor vehicle in an essentially vertical plane 14. Such an arrangement, on the one hand, enables a ready installation and mounting of the parts and, on the other, assures a tight closure of the door as a result of the essentially even contact pressure along the entire circumference of the door.

The cross-sectional view illustrated in Figure 4 shows, on a larger scale, an embodiment of a guide means 7' for the sliding door 10 and the support bracket 16 by means of which the rollers 17 and 17' are maintained in the guide means 7' for rolling movement therein. The guide means 7' may be constituted again by a guide rail of any suitable shape, such as U-shaped cross section, as shown in the drawing. The door support member 19 is pivotally secured by means of the pivotal joint 18 with respect to the parts 16, 17, 17' constituting the guide means therefor while the door 10 is securely fastened in any suitable manner to the door support member 19. The guide rail 7' is supported within a U-shaped bearer member 21 which forms a part of the longitudinal sill or threshold beam 4' by the interposition of rubber buffers, cushions, inserts or the like of predetermined profile and generally designated by reference numeral 23.

Figures 5 and 6 illustrate in detail how the guide rail 7' is inserted into the rubber bushings and is maintained and secured therein. The upper rubber buffer or cushion 24 which extends along the U-shaped bearer member 21 already presents the entire final shape used for purposes of bearing or supporting therein the guide rail 7' and follows with the rounded portion 25 thereof the upper part of the guide rail 7'. In contrast thereto, the lower rubber profile or bushing 26 is only drawn or bent upwardly with the edge 27 on one side thereof. After emplacement of the guide rail 7', the upper edge of the lower rubber insert or cushion 26 also abuts against the guide rail 7'. For purposes of securing the guide rail 7' against becoming loose or falling out, a rubber strip or member 28 is inserted between the wall of the U-shaped bearer member 21 and the rubber support 26, as shown in Figure 6, whereby the upper outer edge 29 of the rubber strip or insert 26 is adapted to the lower side of the guide rail 7' so that the guide rail 7' is thereby secured in such position. For purposes of securing the guide rail 7', any other suitable means, such as a spacer, a wire spiral, a strut member or the like, may be used.

Figure 7 illustrates a guide arrangement which is constructed of particularly great length and which includes a further support member in the center thereof for the upper cover panel simultaneously constituting the door sill or threshold.

The cover panel 11' is secured at the longitudinal sill or threshold member 4' and is provided on the inside, laterally and in the upper part thereof with a longitudinal slot 33 through which extend the lower parts of the door support member 19. Since the longitudinal slot 33 extends over a relatively great length and since the cover panel simultaneously serves in the upper part 34 thereof as door sill or threshold, it is advantageous to additionally support the upper threshold part 34 in the center thereof. A springy strut or brace 35 serves this purpose which in the normal position, as illustrated in the drawing, is forced by the effect of the coil spring 36 against the lower edge of the threshold part 34 and simultaneously supports the threshold part at that place. During traversal of the door support member 19, the brace 35 is springily bent inwardly only to be forced back into the normal position thereof after passage of the support member 19 in which position it again braces the threshold part 34. The door support member 19 is made in the embodiment illustrated in Figure 7 of spring steel so that during opening and closing of the door and in case of any possible use of force, the support member 19 is not bent. The support member 19 extends up to the region of the door lock and is connected together therewith with the door of the vehicle in the upper bore 37.

As shown in Figure 8, a guide sleeve 12" may be secured to the support member 19. Sleeve 12" together with either member 12 or 12' constitute a portion of the locking mechanism.

While I have shown and described several embodiments in accordance with the present invention, it is understood that the same is not limited thereto but is susceptible of many changes and modifications within the spirit of the present invention, and I intend to cover all such changes and modifications as encompassed in the appended claims.

I claim:

1. A guide arrangement for a sliding door of a motor vehicle provided with longitudinal bearer means, said door being slidingly guided only within a lower region thereof, comprising guide means detachably secured to said bearer means, cover means for said guide means secured to said bearer means, and support means operatively connecting said guide means with said door including pivot means for pivotably mounting said door on said support means enabling pivotal movement thereof about the axis of said pivot means.

2. A guide arrangement for a sliding door of a motor vehicle according to claim 1, wherein said guide means is constructed as a guide rail, and wherein both said guide rail and said cover means are of greater length than said longitudinal bearer means.

3. A guide arrangement for a sliding door of a motor vehicle according to claim 1, wherein said cover means is provided laterally thereof with a slot and is covered on top thereof.

4. A guide arrangement for a sliding door of a motor vehicle provided with longitudinal bearer means, said door being slidingly guided only within a lower region thereof, comprising guide means detachably secured to said bearer means, cover means for said guide means secured to said bearer means, support means operatively connecting said guide means with said door including pivot means for pivotally mounting said door on said support means enabling pivotal movement thereof about the axis of said pivot means in an essentially transverse direction of the vehicle, and locking means for said door, said guide means and locking means being disposed in essentially a vertical plane.

5. A guide arrangement for a sliding door of a motor vehicle provided with longitudinal bearer means, said door being slidingly guided only within a lower region thereof, comprising guide means including a guide rail detachably secured to said bearer means, and cover means for said guide means secured to said bearer means, and support means operatively connecting said guide means with said door including pivot means for pivotally mounting said door on said support means enabling pivotal movement thereof about the axis of said pivot means in an essentially transverse direction of the vehicle.

6. A guide arrangement for a sliding door of a motor vehicle according to claim 5, wherein said guide means includes elastic means for embedding therein said guide rail and for retaining the same in the assembled position.

7. A guide arrangement for a sliding door of a motor vehicle according to claim 6, wherein said elastic means includes an upper and a lower rubber cushion whereby for purposes of assembly said guide rail is adapted to be inserted with the outer edge thereof into one of said cushions and then is brought into the essentially vertical assembled position by being inserted into the other rubber cushion.

8. A guide arrangement for a sliding door of a motor vehicle according to claim 7, wherein said one rubber cushion is the upper rubber cushion and said other cushion is the lower rubber cushion for said guide rail, and means inserted between the outer edge of said lower rubber cushion and said bearer means for retaining said guide rail in the assembled position.

9. A guide arrangement for a sliding door of a motor vehicle provided with longitudinal bearer means, said door being slidingly guided only within a lower region thereof, comprising guide means detachably secured to said bearer means, cover means for said guide means secured to said bearer means, and support means operatively connecting said guide means with said door including pivot means for pivotally mounting said door on said support means, said cover means and said bearer means forming the door sill, and a slot for said support means in said sill along the inside thereof and in the upper part thereof, said slot having a length corresponding to the overall length of the sliding movement of the door and of the width of said support means.

10. A guide arrangement for a sliding door of a motor vehicle according to claim 9, wherein said sill is constituted by the upper surface of said cover means, and spring loaded means disposed essentially in the center of said slot for additionally bracing said upper surface, said last-mentioned means being adapted to be pressed inwardly during passage of said support means past said last-mentioned means.

11. A guide arrangement for a sliding door of a motor vehicle according to claim 1, wherein said support means is made of spring steel.

12. A guide arrangement for a sliding door of a motor vehicle according to claim 4, wherein said support means extends within the region of said door locking means and forms part thereof.

References Cited in the file of this patent

UNITED STATES PATENTS

| | | |
|---|---|---|
| 408,502 | Morley | Aug. 6, 1889 |
| 1,339,790 | Salladay | May 11, 1920 |
| 2,701,162 | Kliger | Feb. 1, 1955 |

FOREIGN PATENTS

| | | |
|---|---|---|
| 1,027,136 | France | Feb. 11, 1953 |
| 663,994 | Great Britain | Jan. 2, 1952 |
| 457,337 | Italy | May 15, 1950 |